United States Patent
Shaffer et al.

(10) Patent No.: US 6,754,335 B1
(45) Date of Patent: Jun. 22, 2004

(54) CALL CENTER WITH LOCATION QUEUING AND DISPATCHING

(75) Inventors: Shmuel Shaffer, Palo Alto, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 09/967,591

(22) Filed: Sep. 27, 2001

(51) Int. Cl.[7] .............................................. H04M 3/00
(52) U.S. Cl. .................................. 379/266.02; 379/45
(58) Field of Search ....................... 379/266.01, 266.02, 379/266.03, 309, 45

(56) References Cited

U.S. PATENT DOCUMENTS 6,496,580 B1 * 12/2002 Chack ................... 379/266.01

\* cited by examiner

*Primary Examiner*—Creighton Smith
(74) *Attorney, Agent, or Firm*—Baker Botts L.L.P.

(57) ABSTRACT

A system and method to queue, dispatch, send announcements to incoming calls to an emergency response center (ERC) is disclosed. The present invention employs location-based queuing and dispatching to prioritize callers such that callers reporting known occurrence are removed from the queue of the ERC and sent appropriate announcements, thus increasing response time of unique non-reported occurrences at the ERC.

57 Claims, 2 Drawing Sheets

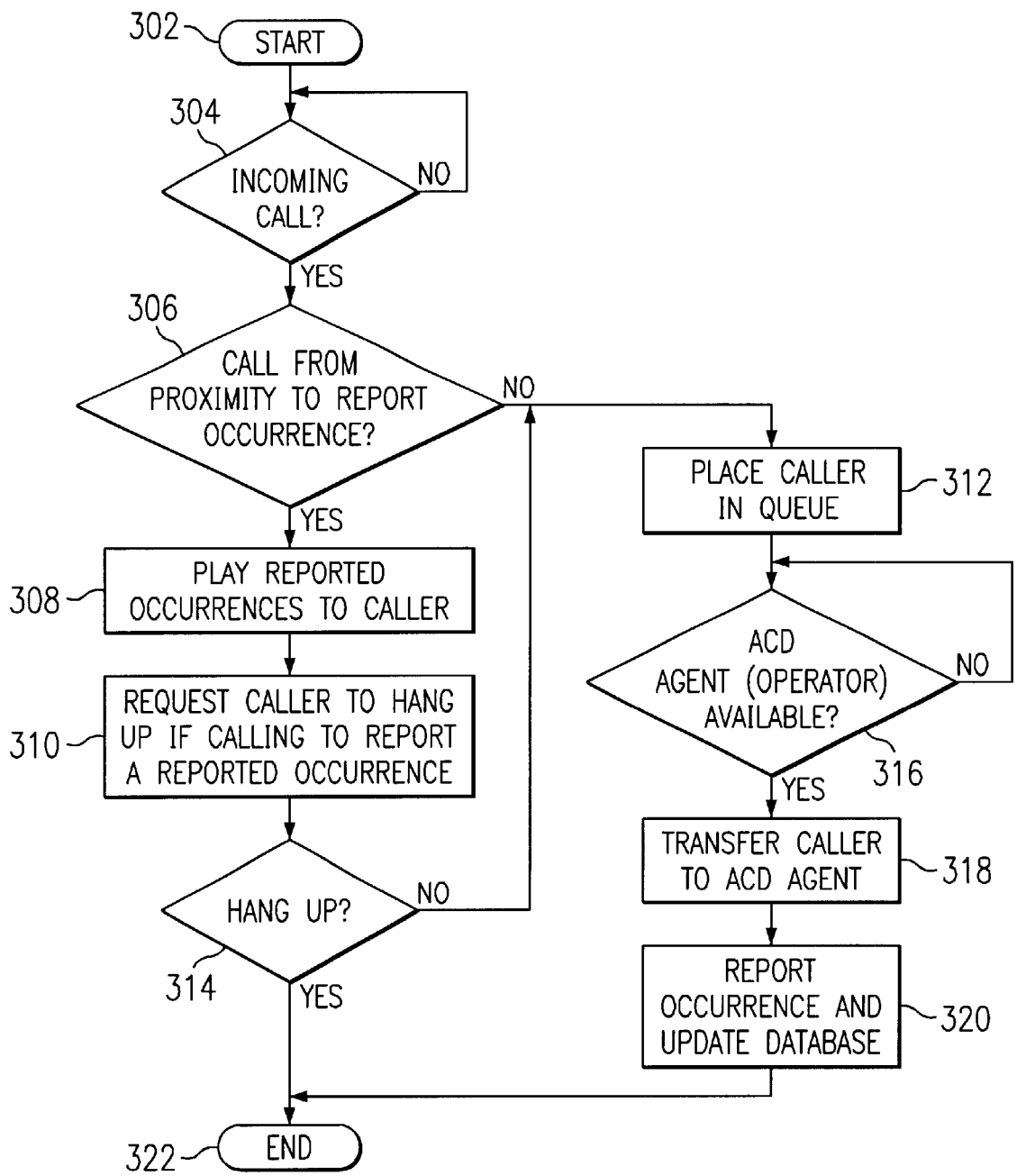

US 6,754,335 B1

CALL CENTER WITH LOCATION QUEUING AND DISPATCHING

TECHNICAL FIELD OF THE INVENTION

The present invention relates generally to announcements, queuing and dispatching. In particular, the present invention relates to announcements, queuing and dispatching for emergency response centers.

BACKGROUND OF THE INVENTION

Emergency Response Centers (ERC) (e.g. 911) employ automated call distributors to answer, queue, and dispatch calls in the order in which they are received. With the recent proliferation of wireless phones, e.g., cellular phones, ERC's are faced with a new challenge. In particular, when an emergency occurs there are usually numerous people with wireless phones who can report an emergency to an ERC. However, when multiple people call to report the same emergency, e.g., a fire at a particular dwelling or an accident at an intersection, the ERC's queue becomes excessively long when compared to the number of actual unique accidents for which callers in the queue are attempting to report. This increases the "call waiting" time in the queue for each caller, making it difficult for other callers to report and request help for different emergencies. For example, the first five callers in a queue may be wireless users attempting to report an automobile accident at Broadway and $42^{nd}$ Street in a given city, while the sixth caller in the queue is trying to report a gas fire at a different location. Based upon known ERC queuing and dispatching mechanisms, the sixth caller will be left waiting in the queue for an available operator until one or more operators waste time with callers two through five, who were simply reporting the same emergency as the first caller in the queue.

SUMMARY OF THE INVENTION

The present invention relates to a system and method for queuing, dispatching and generating announcements for incoming calls. In particular, the present invention relates to queuing, dispatching and generating announcements for incoming calls received by an Emergency Response Center (ERC) by classifying callers based on the location from which they are calling. In accordance with an exemplary embodiment of the present invention, if the ERC receives a call which originates near a known emergency, the call may be placed in a low priority position in the ERC's queue or the ERC may simply provide a pre-recorded announcement indicating to the caller the reported emergency(ies) near the location of the caller, thus providing the caller with the option of hanging-up and relieving the ERC's queue if the emergency has already been reported. This embodiment provides the technical advantage that callers from unique locations will be serviced before callers from known emergency locations. This is unlike conventional systems where callers are placed in the queue solely based upon the first to call.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 3 is a flow chart illustrating an exemplary embodiment of the queuing and dispatching system of the present invention.

DETAILED DESCRIPTION OF THE INVENTION

Figure 1:
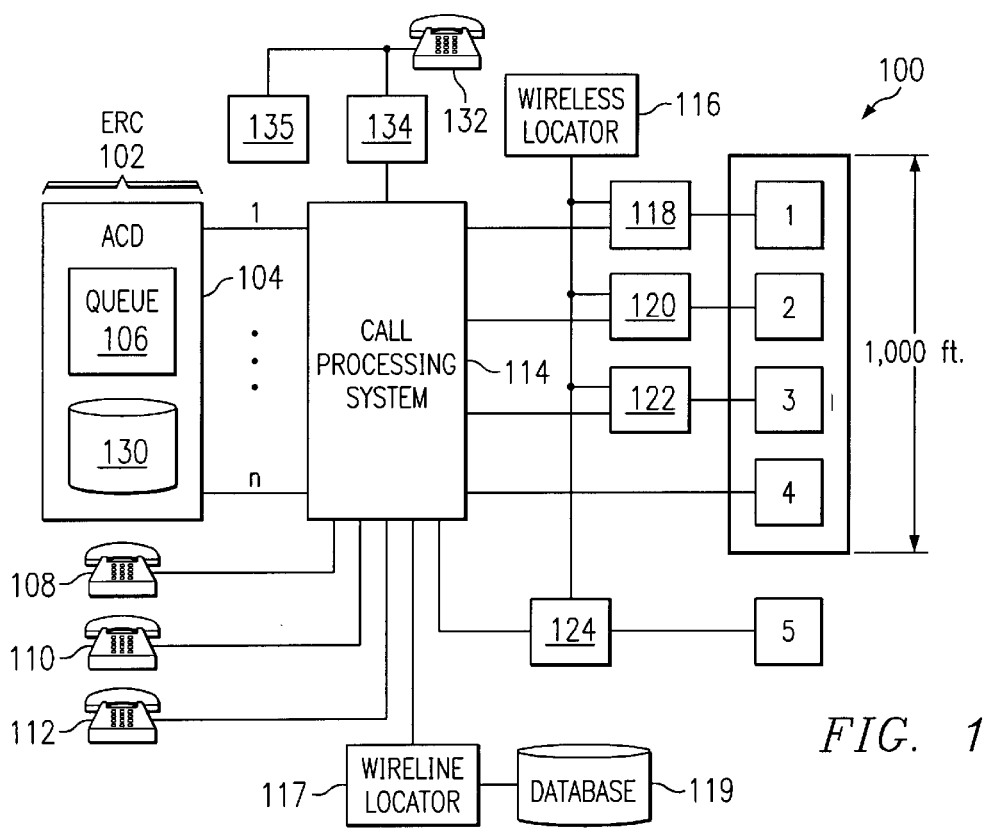
FIG. 1 is an illustration of a call dispatch system utilizing an Emergency Response Center (ERC) featuring a queuing and dispatching system and method in accordance with an exemplary embodiment of the present invention.

Now referring to the drawings, FIG. 1 illustrates a call dispatch system 100. The call dispatch system 100 includes an ERC 102, a call processing system 114, wireless locator 116 and a wireline locator 117. The ERC 102 includes an automatic call distributor ("the ACD") 104 which includes a queue 106. Queue 106 may be one queue or a plurality of queues, as discussed below. The ACD 104 may be a computer server. The queue 106 may also be a computer server, a general purpose computer, a private branch exchange device, random access memory, dynamic random access memory, EEPROM, flash memory or firmware within the ACD 104.

The ACD 104 is connected to and receives calls from the call processing system 114. Call processing system 114 is connected to one or more operator devices 108, 110, 112. The operator devices 108, 110, 112 may also be referred to as "ACD agents." The operator devices 108, 110, 112 may be wireless devices, e.g., wireless telephones; wireline devices, e.g., conventional telephones; general purpose computers; personal digital assistant ("PDA") devices; two-way paging devices; Internet Protocol devices; or voice over Internet Protocol (VoIP) devices. The queue 106 maintains the priority order of calls placed in "call waiting" status to connect with the operator devices 108, 110, 112 by the ACD 104. The call processing system 114 can be a conventional switch used with modem day public switching telephone networks. The call processing system 114 is connected to and receives calls from the reporting devices 1, 2, 3, 4 and 5. The reporting devices 1, 2, 3, 4 or 5 may be wireless devices, e.g., wireless telephones; wireline devices, e.g., conventional telephones; general purpose computers; PDA devices; two-way paging devices; Internet Protocol devices; or voice over Internet Protocol (VoIP) devices. In this exemplary embodiment, reporting devices 1, 2, 3 and 5 are wireless devices and reporting device 4 is a wireline device. The wireless devices 1, 2 and 3 and the wireline device 4 are all physically at the same location, within 1,000 feet of one another. The wireless device 5 is at least 10,000 feet away from the above-mentioned devices. The wireless devices 1, 2, 3 and 5 may be wireless telephones or any other wireless devices capable of bilateral real-time communication. The wireline device 4 may be a wireline telephone, e.g., a conventional wired telephone. The wireless devices 1, 2, 3 and 5 transmit their communication signal to a base station 118, 120, 122, 124 respectively. In this exemplary embodiment, multiple base stations are illustrated. In actuality, the number of base stations may vary depending upon the configuration of the wireless networks utilized by the wireless devices 1, 2, 3 or 5. The base stations 118, 120, 122, 124 are connected to the wireless locator 116. The wireless locator 116 provides physical location data for the wireless devices 1, 2, 3 and 5. Such functionality will be required of all wireless providers in North America. In particular, the wireless locator 116 provides a digital bit stream to the base stations 118, 120, 122, 124 indicating the location of each of the wireless devices 1, 2, 3 or 5 at the time at which a call was initiated from one or more of the wireless devices 1, 2, 3 or 5. Further, wireline locator 117 is connected to call processing system 114. Wireline locator 117, similar to wireless locator 116, provides location data for wireline device 4 by utilizing a wireline database 119. Wireline database 119 essentially contains a caller identification ("caller ID") look-up table.

In addition to wireline and wireless devices, call processing system 114 connects calls from Internet Protocol ("EP") devices such as IP device 132. IP device 132 may be a voice over IP ("VoIP") telephone. In an exemplary embodiment, IP device 132 connects to call processing system 114 through gateway 134. IP locator 135, similar to wireless location 116, provides physical location data, based on the IP address, for IP device 132.

In operation, in accordance with an exemplary embodiment of the present invention, a person attempting to report an occurrence requiring additional help, calls the ERC, e.g., using "911," on the wireless device 1. The wireless device 1 contacts the base station 118 to establish the connection. The base station 118, upon reading the number to be contacted, an ERC, in the header of the initial bit stream received from the wireless device 1, contacts the wireless locator 116 to determine the current position of the wireless device 1. The wireless locator 116 returns location data to the base station 118 indicating the physical location of the wireless device 1. The base station 118 then passes the call to the call processing system 116 with the destination, e.g., an ERC, as well as the location data received from the wireless locator 116. In a digital system, this information can be transmitted in the header of the bit stream or on a separate data packet, although the present system and method are not limited to digital systems. The call processing system 114 connects and passes the call to the ACD 104 which, assuming an operator is not available to take the call at one of the operator devices 108, 110, 112, places the call in the queue 106 maintaining the location information from the wireless locator 116, IP locator 135, or wireline locator 117 (discussed below). When an operator at one of the operator devices 108, 110, 112 becomes available, the wireless device 1 is connected to such one of the available operator devices 108, 110, 112. The operator at the operator device 108, 110, 112 requests information on the type of occurrence and verifies the location of the occurrence. If the occurrence is at the same location as the initial location of the wireless device 1, as indicated by the wireless locator 116, then the operator via the operator device 108, 110, 112 places such information in a reported occurrences database 130 in the ACD 104. Since, the queue already has such location data, an operator need only send that data to the reported occurrence database or slightly modify such data that need be changed and then send such modified data to the reported occurrence database 130. In addition to the location of the occurrence, in this exemplary embodiment, the operator also sends data indicating the type of occurrence, e.g., fire, flood, automobile accident, robbery, etc. The process of obtaining this additional data may also be highly automated. In one exemplary embodiment, prior to being placed in the queue 106, the wireless device 1 is prompted to enter, e.g., "1" for flood, "2" for fire, "3" for automobile accident, "4" for robbery, etc. Alternatively, the operator may enter such information either by text entry or by using a speech to text system in which the operator or caller may speak the type of occurrence when prompted, where such speech to text recognition converts the voice to text and appends the data to the verified location data to be placed in the reported occurrence database 130. Further, in accordance with another exemplary embodiment, the initial location of the wireless device 1 and type of occurrence to be reported, gathered by input from the wireless device 1, can be automatically sent to the reported occurrences database 130 before operator intervention. In this case, the operator will simply verify and modify, if necessary, the information already in the reported occurrences database 130.

Thereafter, it is assumed that two additional people calling from the wireless devices 2 and 3 also call the ERC to report the same occurrence as will be reported or that has been reported by the caller from the wireless device 1. The calls from the wireless devices 2 and 3 will be transferred to the queue 106 in a similar way as from the wireless device 1, described above, with the exception that the calls from the wireless devices 2 and 3 may travel via different base stations, in this case the base stations 120 and 122. When the call from the wireless device 2 reaches the queue 106, much in the same way as the wireless device 1, the queue 106 performs a match to determine if the location of the wireless device 2, supplied by the wireless locator 116, is within a pre-determined physical range, in this example 1,000 foot radius, of an occurrence in the reported occurrence database 130 such as to determine whether the wireless device 2 may be calling to report the same occurrence as the wireless device 1. Calls falling within 1,000 foot radius of a location in the reported occurrence database 130 are deemed to be potentially the same occurrence. In this case, the wireless device 2 is less than 1,000 feet from the location of the reported occurrence. Thereafter, the ACD 104, using text to speech methods, takes the data, in text form, of the potentially matched occurrence in the reported occurrence database 130 and may either: (1) issue a voice announcement to the wireless device 2 indicating the location of the reported occurrence and type of occurrence near the wireless device 2, as reported by the wireless device 1 in this instance, and that if the wireless device 2 is calling to report the same occurrence to please hang up; (2) prompt the wireless device 2 for input, e.g., issue an announcement to the wireless device 2 indicating the location of the reported occurrence and type of occurrence near the wireless device 2, as reported by the wireless device 1 in this instance, having the caller of the wireless device 2 enter a "1" if the occurrence is different and disconnecting the wireless device 2 if "1" is not received as input, where it is assumed that the caller of the wireless device 2 is calling to report the same occurrence as the wireless device 1; or (3) simply place the call from the wireless device 2 at the bottom of the queue 106. In this second exemplary method, if the wireless device 2 enters a "1", then the call from the wireless device 2 remains in the queue as a caller who is attempting to report a unique occurrence.

In this example, since the wireless device 2 is actually within 1,000 feet of the reported occurrence, after a correct response by the caller of the wireless device 2, e.g., hanging up after the above announcement has been rendered by the ACD 104, the wireless device 2 will no longer be waiting in the queue 106 wasting valuable resources. The same will happen with the wireless device 3 and the wireline device 4 because both devices are also, in this example, within 1,000 feet of the reported occurrence, as described above. Alternatively, if by chance the caller of wireless device 2 was actually attempting to report a non-reported occurrence, the wireless device 2 would remain in the queue and the ACD 104 would adjust the announcement to future callers to include the two occurrences. Please note that you cannot pinpoint a wireless device's location with absolute accuracy.

With respect to wireline device 4, discussed above, if a person is attempting to report an occurrence requiring additional help on wireline device 4, the wireline device 4 contacts the call processing system 114 which in turn sends a request to wireline locator 117 for location data for the wireline device 4. Wireline locator 117 then queries wireline database 119 which returns the query results, the location data, to call processing system 114. The call processing system 114 then connects and passes the call, with the location data, to the ACD 104 which, assuming an operator is not available to take the call at one of the operator devices 108, 110, 112, places the call in the queue 106 maintaining the location information from the wireline locator 117. Once in the queue 106, the call from the wireline device 4 is treated the same as wireless devices 1, 2 and 3, described above.

Continuing the above-example for explanatory purposes, after the wireless device 4 places a call to the ERC 102, the wireless device 5 places a call to the ERC 102. The wireless device 5 is at least 10,000 feet away from the reported occurrence. Therefore, once the wireless device 5 is connected to the queue 106, its location data, being outside of the 1,000 foot default of the known occurrence, indicates to the ACD 104 that the wireless device 5 is calling or presumed to be calling about a unique occurrence which has not yet been reported. However, since the ACD 104 has dispensed with calls from the wireless devices 2 and 3 and the wireline device 4, the wireless device 5 will be at the top of the queue 106 and need only wait for an available operator with no redundant calls placed before it. This greatly increases efficiency of the ERC 102 as well as decreases response time for emergency personnel to respond to an occurrence.

In another exemplary embodiment, queue 106 may comprise a plurality of queues. In accordance with this exemplary embodiment, the wireless device may be directed to a first queue in the plurality of queues 106 if its location data is outside of the 1,000 foot default or to a second queue in the plurality of queues 106 if its location data is within the 1,000 foot default. Thus, by giving each queue equal priority, the wireless device 5 would connect to an operator prior to the wireless device 2, 3 and 4, assuming that the call from the wireless device 5 was received prior to the calls from wireless devices 2, 3 and 4 reached the front of the first queue in the plurality of queues 106.

Figure 2:
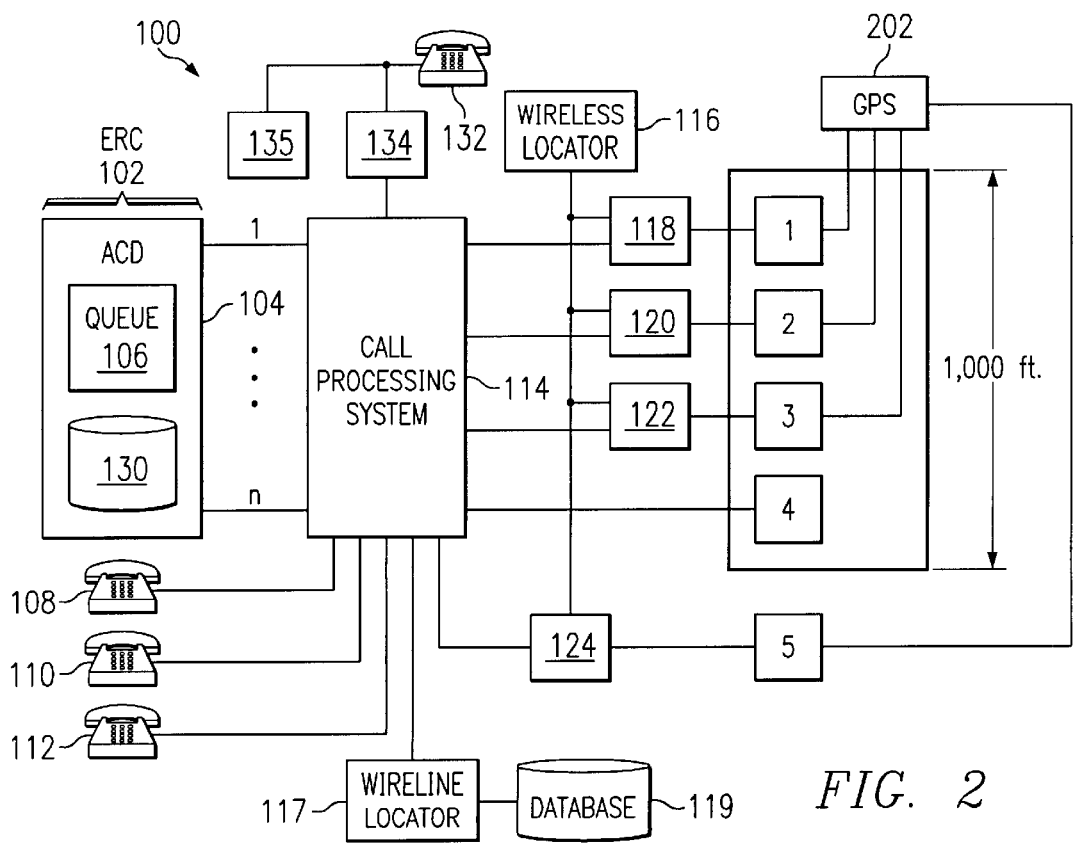
FIG. 2 is an illustration of a call dispatch system utilizing an Emergency Response Center (ERC) featuring a queuing and dispatching system and method in accordance with another exemplary embodiment of the present invention.

The wireless locator 116 described above has been shown in the exemplary embodiment as interfacing with the base stations 118, 120, 122 and 124. The functionality of the wireless locator 116 may also be implemented in the ACD 104 or by using a global positioning satellite system ("GPS") which interfaces directly with the wireless device 1, 2, 3 and 5. The latter exemplary embodiment is shown in FIG. 2, featuring a GPS 202.

FIG. 3. is a flow chart illustrating the above-described exemplary embodiment of the present invention. In FIG. 3. an incoming call from a reporting device 1, 2, 3, 4, or 5 is received at the ACD 104 in block 304. In block 306, the location of the reporting device 1, 2, 3, 4 or 5 is compared with reported occurrences in the reported occurrences database 130 within a pre-determined period of time (a time-out period). If the reporting device is within a pre-defined range, e.g. 1,000 feet of a reported occurrence, in block 308, an announcement indicating the known occurrence is played to the incoming caller. Then, in block 310, the incoming caller is asked to hang-up if their occurrence has already been reported, i.e., was listed in the announcement. If the incoming caller hangs up, in block 314, the call is ended in block 322. If the incoming caller does not hang-up, the incoming caller is placed in the queue 106 in block 312. On the other hand, if the reporting device 1, 2, 3, 4 or 5 was outside the pre-defined range, the call is immediately place in the queue 106.

One in the queue 106, the incoming caller waits for an operator (ACD agent) to become available in block 316. Once available, the incoming caller is transferred to an operator in block 318. Once transferred, the incoming caller from reporting device 1, 2, 3, 4 or 5 may report their occurrence to an operator at the ERC 102 at block 320.

The above described exemplary embodiment is simply one way to implement the system and method of the present invention. Similarly, the above described example of operation has been use for explanatory purposes only. Many different scenarios may be manifested by the system and method of the present invention. For example, there may be circumstances where a subsequent call from the same location may be give a higher priority, such that the type of priority given a caller may be selective. Further, the system and method of the present invention may be implemented for call queuing and distribution for applications other than ERCs.

What is claimed is:

1. A system for queuing and dispatching incoming calls to an operator device based upon the location of a reporting device, said system comprising:
    an automatic call distributor, said automatic call distributor dispatching and prioritizing incoming calls originating from a reporting device to an operator device based upon the location of said reporting device.

2. The system of claim 1, wherein said automatic call distributor comprises a location-based queue, said location-based queue providing a waiting mechanism for incoming calls from said reporting device when said reporting device is within a determined distance from a location of a pre-existing incoming call, said pre-existing incoming call received within a pre-determined period of time.

3. The system of claim 1, wherein said automatic call distributor comprises a location-based queue, said location-based queue providing a low priority for incoming calls from said reporting device when said reporting device is within a determined distance from a location of a pre-existing incoming call, said pre-existing incoming call received within a pre-determined period of time.

4. The system of claim 1, wherein said automatic call distributor comprises at least two location-based queues, said at least two location-based queues providing a waiting mechanism for incoming calls from said reporting device when said reporting is within a determined distance from a location of a pre-existing incoming call, said pre-existing incoming call received within a pre-determined period of time, wherein incoming calls from said reporting device within a determined distance from a location of a pre-existing incoming call are placed in said first of said at least two queues and incoming calls from said reporting device outside of said determined distance are placed in a second of said at least two queues.

5. The system of claim 1, wherein said reporting device comprises one of a wireless telephone, a wireline telephone, a general purpose computer, personal digital assistant, two way paging device, Internet Protocol device, and voice over Internet Protocol telephone.

6. The system of claim 1, wherein said operator device comprises one of a wireless telephone, a wireline telephone, a general purpose computer, personal digital assistant, two way paging device, Internet Protocol device, and voice over Internet Protocol telephone.

7. The system of claim 1, wherein said automatic call distributor comprises a computer server.

8. The system of claim 1, wherein said queue comprises one of a computer server, a general purpose computer, a private branch exchange device, a random access memory, a dynamic random access memory, EEPROM, and flash memory.

9. The system of claim 1 further comprising a wireless device locator, said wireless device locator supplying said automatic call distributor with a physical location of said reporting device.

10. The system of claim 1 further comprising a wireline device locator, said wireline device locator supplying said automatic call distributor with a physical location of said reporting device.

11. The system of claim 1 further comprising an Internet Protocol device locator, said Internet Protocol device locator supplying said automatic call distributor with a physical location of said reporting device.

12. The system of claim 1 further comprising a wireline database, said wireline database supplying said automatic call distributor with a physical location of said reporting device based upon the caller identification of said reporting device.

13. The system of claim 1 further comprising a global positioning satellite system, said global positioning satellite system supplying said reporting device with a physical location of said reporting device.

14. The system of claim 1, wherein said reporting device comprises an Internet Protocol device, said Internet Protocol device receiving location information of said reporting device based on an Internet Protocol address.

15. The system of claim 1, wherein said reporting device comprises an Internet Protocol device, said Internet Protocol device receiving location information of said reporting device based on a switch port to which said Internet Protocol device is connected.

16. The system of claim 1 further comprising a call processing device, said call processing device connecting said reporting device to said automatic call distributor.

17. The system of claim 1 further comprising a speech to text device, said speech to text device converting speech to text to obtain the type of occurrence from said reporting device.

18. The system of claim 2, wherein said location-based queue plays announcements containing information about occurrences that have occurrence within a pre-defined proximity of said reporting device.

19. The system of claim 1 further comprising a text to speech device, said text to speech device converting text to speech to construct an announcement which prompts said reporting device to indicate whether an occurrence to be reported by said reporting device has already been reported.

20. The system of claim 1 further comprising a text to speech device, said text to speech device converting text to speech to construct an announcement to be sent to said reporting device indicating that an occurrence near the physical location of said reporting device has already been reported.

21. An emergency response system for queuing and dispatching incoming calls, said system comprising:

an automatic call distributor, said automatic call distributor dispatching incoming calls originating from a reporting device to an operator device for reporting an emergency, said automatic call distributor comprising a location-based queue, said location-based queue prioritizing said incoming calls based upon the location of said reporting device, wherein if said reporting device is physically within a determined distance from an emergency already known said incoming call from said reporting device is given a selective priority.

22. The system of claim 21, wherein said automatic call distributor comprises at least two location-based queues, said at least two location-based queues providing a waiting mechanism for incoming calls from said reporting device when said reporting is within a determined distance from a location of a pre-existing incoming call, said pre-existing incoming call received within a pre-determined period of time, wherein incoming calls from said reporting device within a determined distance from a location of a pre-existing incoming call are placed in said first of said at least two queues and incoming calls from said reporting device outside of said determined distance are placed in a second of said at least two queues.

23. The system of claim 21, wherein said reporting device comprises one of a wireless telephone, a wireline telephone, a general purpose computer, personal digital assistant, two way paging device, Internet Protocol device, and voice over Internet Protocol telephone.

24. The system of claim 21, wherein said operator device comprises one of a wireless telephone, a wireline telephone, a general purpose computer, personal digital assistant, two way paging device, Internet Protocol device, and voice over Internet Protocol telephone.

25. The system of claim 21, wherein said automatic call distributor comprises a computer server.

26. The system of claim 21, wherein said queue comprises one of a computer server, a general purpose computer, a private branch exchange device, a random access memory, a dynamic random access memory, EEPROM, and flash memory.

27. The system of claim 21 further comprising a wireless device locator, said wireless device locator supplying said automatic call distributor with a physical location of said reporting device.

28. The system of claim 21 further comprising a wireline device locator, said wireline device locator supplying said automatic call distributor with a physical location of said reporting device.

29. The system of claim 21 further comprising an Internet Protocol device locator, said Internet Protocol device locator supplying said automatic call distributor with a physical location of said reporting device.

30. The system of claim 21 further comprising a wireline database, said wireline database supplying said automatic call distributor with a physical location of said reporting device based upon the caller identification of said reporting device.

31. The system of claim 21 further comprising a global positioning satellite system, said global positioning satellite system supplying said reporting device with a physical location of said reporting device.

32. The system of claim 21, wherein said reporting device comprises an Internet Protocol device, said Internet Protocol device receiving location information of said reporting device based on an Internet Protocol address.

33. The system of claim 21, wherein said reporting device comprises an Internet Protocol device, said Internet Protocol device receiving location information of said reporting device based on a switch port to which said Internet Protocol device is connected.

34. The system of claim 21 further comprising a call processing device, said call processing device connecting said reporting device to said automatic call distributor.

35. The system of claim 21 further comprising a speech to text device, said speech to text device converting speech to text to obtain the type of occurrence from said reporting device.

36. The system of claim 22, wherein at least one of said at least two location-based queues plays announcements containing information about occurrences that have occurrence within a pre-defined proximity of said reporting device.

37. The system of claim 21 further comprising a text to speech device, said text to speech device converting text to speech to construct an announcement which prompts said reporting device to indicate whether an occurrence to be reported by said reporting device has already been reported.

38. The system of claim 21 further comprising a text to speech device, said text to speech device converting text to speech to construct an announcement to be sent to said reporting device indicating that an occurrence near the physical location of said reporting device has already been reported.

39. A method for queuing and dispatching incoming calls based upon the location of a caller, said method comprising:
determining a location of a reporting device attempting to connect to an operator device; and
routing a call from said reporting device to a queue based on the location of said reporting device.

40. The method of claim 39, wherein said routing said call from said reporting device to a queue comprises routing said call to one of a plurality of queues based upon the distance said reporting device is from a location of a pre-existing incoming call, said pre-existing incoming call being received within a predetermined time period, and placing said call from said reporting device in one of said plurality of queues containing said pre-existing incoming call which is within a determined distance from said reporting device.

41. The method of claim 40 further comprising prioritizing said call within one of said plurality of queues in which it resides, said prioritization based upon the distance said reporting device is from a location of a pre-existing incoming call, said pre-existing incoming call being received within a predetermined time period.

42. The method of claim 29 further comprising sending an announcement to said reporting device if said reporting device is within a determined distance from a location of a pre-existing reported occurrence, said pre-existing reported occurrence being received within a predetermined time period.

43. The method of claim 42, wherein said announcement conditionally instructs said reporting device to disconnect.

44. The method of claim 42, wherein said announcement comprises a list of previous reported occurrences which may be the same as that of said reporting device.

45. The method of claim 44 further comprising receiving input from said reporting device indicating if an occurrence to be reported by said reporting device is the same as an already known occurrence indicated by said announcement.

46. The method of claim 45, wherein if said occurrence to be reported is the same as an already reported known occurrence, as determined by said input, said call is removed from said queue.

47. The method of claim 45, wherein if said occurrence to be reported is not same as an already reported known occurrence, as determined by said input, said call is prioritized within said queue.

48. The method of claim 39 further comprising determining a location of reporting device, wherein said determining a location of reporting device comprises using a global positioning satellite system to determine said location of said reporting device.

49. The method of claim 39, further comprising determining a location of reporting device, wherein said determining a location of device reporting device comprises using a caller identification look-up table to obtain a physical location of said reporting device based upon a caller identification of said reporting device.

50. The method of claim 39 further comprising determining a location of reporting device, wherein said determining a location of device reporting device comprises using an Internet Protocol address of said reporting device to obtain a physical location of said reporting device.

51. The method of claim 39 further comprising determining a location of reporting device, wherein said determining a location of device reporting device comprises using a port of an Internet Protocol switch port connected to said reporting device to obtain a physical location of said reporting device.

52. The method of claim 39 further comprising converting speech to text to obtain the type of occurrence from said reporting device.

53. The method of claim 39, further comprising sending an announcement to said reporting device containing information about occurrences that have occurred within a pre-defined proximity of said reporting device.

54. The method of claim 39 further comprising converting text to speech to construct an announcement which prompts said reporting device to indicate whether an occurrence to be reported by said reporting device has already been reported.

55. The method of claim 39 further comprising converting text to speech to construct an announcement to be sent to said reporting device indicating that an occurrence near the physical location of said reporting device has already been reported.

56. Logic encoded in a memory device comprising the logic operable to at least:
determine a location of a reporting device attempting to connect to an operator device; and
route a call from said reporting device to a queue based on the location of said reporting device.

57. A system for queuing and dispatching incoming calls to an operator device based upon the location of a reporting device, said system comprising:
means for dispatching incoming calls originating from a reporting device to an operator device; and
means for prioritizing said incoming calls based upon the location of said reporting device.

* * * * *